US011048831B2

(12) United States Patent
De Keyser et al.

(10) Patent No.: US 11,048,831 B2
(45) Date of Patent: Jun. 29, 2021

(54) PREDICTING USER DESIRABILITY OF A CONSTRUCTIONAL CONNECTION IN A BUILDING INFORMATION MODEL

(71) Applicant: Bricsys NV, Ghent (BE)

(72) Inventors: Erik De Keyser, Lochristi (BE); Tjerk Gauderis, Ghent (BE); Luc De Batselier, Drongen (BE)

(73) Assignee: BRICSYS NV, Ghent (BE)

( * ) Notice: Subject to any disclaimer, the term of this patent is extended or adjusted under 35 U.S.C. 154(b) by 485 days.

(21) Appl. No.: 16/040,578

(22) Filed: Jul. 20, 2018

(65) Prior Publication Data

US 2019/0026403 A1 Jan. 24, 2019

(30) Foreign Application Priority Data

Jul. 20, 2017 (EP) .................................... 17182328

(51) Int. Cl.

| | |
|---|---|
| ***G06F 30/13*** | (2020.01) |
| ***G06T 17/00*** | (2006.01) |
| ***G06N 20/00*** | (2019.01) |
| ***G06N 5/00*** | (2006.01) |
| ***G06F 111/04*** | (2020.01) |
| ***G06F 111/20*** | (2020.01) |
| ***G06N 20/10*** | (2019.01) |

(52) U.S. Cl.

CPC ............... *G06F 30/13* (2020.01); *G06N 5/00* (2013.01); *G06N 20/00* (2019.01); *G06T 17/00* (2013.01); *G06F 2111/04* (2020.01); *G06F 2111/20* (2020.01); *G06N 20/10* (2019.01)

(58) Field of Classification Search

CPC .. G06F 30/13; G06F 2111/04; G06F 2111/20; G06T 17/00; G06N 20/00; G06N 20/10; G06N 5/00

See application file for complete search history.

(56) References Cited

U.S. PATENT DOCUMENTS

| | | | | |
|---|---|---|---|---|
| 4,964,060 A | | 10/1990 | Hartsog | |
| 6,859,768 B1 | * | 2/2005 | Wakelam | G06Q 10/06 703/1 |
| 7,889,914 B2 | | 2/2011 | Regli | |
| 2010/0070241 A1 | | 3/2010 | Opdahl | |
| 2013/0173223 A1 | * | 7/2013 | Teller | G06N 20/00 703/1 |
| 2014/0278274 A1 | | 9/2014 | Osher | |
| 2015/0302639 A1 | * | 10/2015 | Malekian | H04L 67/42 345/420 |
| 2016/0299997 A1 | * | 10/2016 | Mitchell | G06F 30/13 |
| 2017/0351972 A1 | * | 12/2017 | Kaniwa | G06N 20/00 |
| 2019/0318048 A1 | * | 10/2019 | Kubicki | G06F 30/13 |

* cited by examiner

*Primary Examiner* — Eunhee Kim

(74) *Attorney, Agent, or Firm* — Maschoff Brennan

(57) ABSTRACT

The current invention concerns a method, a system, and a computer program product for suggesting a detail in a building information model. Based on an initial identification of a detail in relation to two construction elements in a building information model, the invention provides for suggesting to include the detail in relation to another pairs of elements with partially or fully corresponding properties. Based at least in part on acceptance or refusal, a module based on artificial intelligence is trained in order to decide for further pairs of elements whether to suggest inclusion of the detail.

18 Claims, 5 Drawing Sheets

1
2
3
4
5

6
9
7
8
2c
2b
2a
1a
1b
1c
1d
1e 9
2c
2b
2a
1a
1b
1c
1d
1e 2b
2c
9
2a
1a
1b
1c
1d
1e 2c
2b
2a
5a
5e
5d
5c
5b 12
13
4
5
3
2
11
10
9
1

PREDICTING USER DESIRABILITY OF A CONSTRUCTIONAL CONNECTION IN A BUILDING INFORMATION MODEL

This application claims the benefit of European Application No. 17182328.9 filed Jul. 20, 2017, which is hereby incorporated by reference in its entirety as if fully set forth herein.

TECHNICAL FIELD

The invention pertains to the technical field of building information modeling.

BACKGROUND

A building information model (BIM) is a digital representation of physical and functional characteristics of a facility. A BIM is a shared knowledge resource for information about a facility forming a reliable basis for decisions during its life-cycle; defined as existing from earliest conception to demolition. It can pertain to the planning, designing, constructing, operating and/or maintaining of diverse physical infrastructures in a facility, such as water, refuse, electricity, gas, communication utilities, roads, bridges, ports, tunnels, and the like.

A BIM typically contains numerous details, the insertion of which may be laborious and time-consuming work. Making a connection between two elements in a BIM, for example, may involve, after the insertion of the two elements from one or more libraries, a selection of a type of interconnection from yet another library.

U.S. Pat. No. 4,964,060 pertains to a computer aided building plan review system and process. The document discloses the use of artificial intelligence for this purpose. However, the invention does not disclose means to simplify the design process.

U.S. Pat. No. 7,889,914 pertains to the automated learning of model classifications for 3D CAD models. The document discloses the use of artificial intelligence and machine learning for this purpose. However, the invention does not disclose means to simplify the design process.

US 2010/0 070 241 pertains to a computer-based method for automated modelling and design of buildings. However, the document does not disclose efficient means or methods for learning contextual user desirability.

US 2014/0 278 274 pertains to a method for automated optimization of scene configuration. The document discloses the automatic population of a scene with a variety of items via optimization of a cost function. The method is thereby biased by the specific cost function. The document, in addition, does not disclose modification of the items, only repositioning to non-intruding configurations. Furthermore, the document also does not disclose methods or means for continuous learning.

The present invention aims to resolve at least some of the problems mentioned above.

SUMMARY OF THE INVENTION

In a first aspect, the present invention provides a method for predicting user desirability of a constructional connection in a building information model, as disclosed in claim 1.

In a second aspect, the present invention provides a system for predicting user desirability of a constructional connection in a building information model, as disclosed in claim 14.

In a third aspect, the present invention provides a tangible computer-readable non-transitory data carrier comprising a computer program product for predicting user desirability of a constructional connection in a building information model, as disclosed in claim 15.

The present invention is advantageous for several reasons. The insertion of recurring constructional connections in relation to pairs of construction elements is simplified by the computer-implemented machine learning module. The module can be trained via the set of records, thereby learning user desirability to include a specific constructional connection depending on at least one further property of the corresponding building information model. This significantly simplifies the computer-aided design process, as user modeling of constructional connections can be replaced by well-informed and hence a limited amount of suggestions of adopting a constructional connection. The present invention also allows for continuous learning, as acceptance or decline of a suggestion can be used to further train the module.

DETAILED DESCRIPTION OF THE INVENTION

Figure 1A:
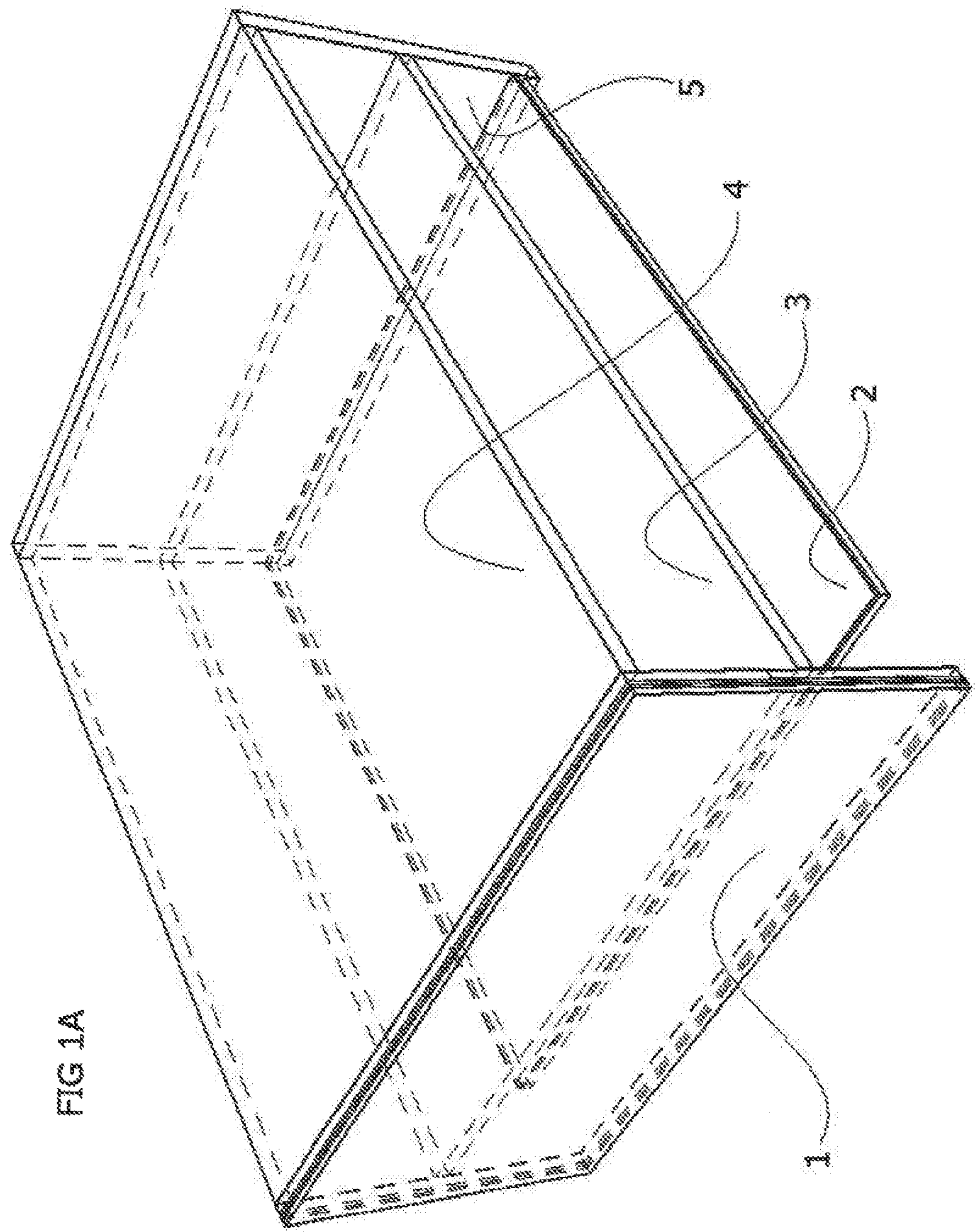
FIGS. 1A to 1G show an example of constructional connection suggestion for multi-layered slabs and walls.

The present invention concerns a computer-implemented method, a computer system, and a computer program product for predicting user desirability of a detail, preferably a constructional connection, in a building information model. The invention was summarized in the corresponding section above. In what follows, the invention is described in detail, preferred embodiments are discussed, and the invention is illustrated by means of examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specify the presence of what follows e.g. component and do not exclude or preclude the presence of additional, non-recited components, features, element, members, steps, known in the art or disclosed therein.

"User input device" as used herein refers to any device configured for providing input by a user to a computing device. The input is not limited by modality and can encompass mechanical movement, sound, images, and the like. The input can be discrete and/or continuous. The input is also not limited by the number of degrees of freedom. The input can be direct or indirect. When input is provided on a position or a position change, e.g. to move a pointer on a screen, the input can be absolute or relative. A non-limiting list of examples of user input devices comprises a keyboard, a computer mouse, a touchpad, a touchscreen, a camera, a scanner, a joystick, a microphone, a light pen, a trackball, a projected keyboard, a game controller, a card reader, and the like.

"Visualization means" as used herein refers to any device or group of devices configured for presenting visual information to a user. A non-limiting list of examples of visualization means comprises a screen, a projector, visualization glasses (i.e. (a) head-mountable screen(s) such as video, theatre, or virtual reality glasses, and the like), a holographic projection device, and the like. Multiple devices can also be used together to form the visualization means. For example, multiple screens connected to a computing device can form a single visualization means.

"Artificial intelligence" (AI) as used herein refers to a field pertaining to machine mimicking of cognitive functions. The central problems of AI research include reasoning, knowledge, planning, learning, natural language processing, perception, and the ability to manipulate objects. Approaches include statistical methods, computational intelligence, and traditional symbolic AI. The AI field draws upon computer science, mathematics, psychology, linguistics, philosophy, neuroscience, artificial psychology, and many others. Capabilities classified as AI include successfully understanding human speech, competing at a high level in strategic game systems, autonomous cars, intelligent routing in content delivery networks, interpreting complex data, and the like. The AI field encompasses the field of machine learning. A non-limiting list of techniques used in machine learning comprises decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, and learning classifier systems. A non-limiting list of software programs and/or libraries used for machine learning comprises Apache SINGA, Caffe, Deeplearning4j, Dlib, Keras, Microsoft Cognitive Toolkit, Microsoft Computational Network Toolkit, MXNet, Neural Designer, OpenNN, Pytorch, Scikit-learn for the Python programming language, TensorFlow, Theano, Torch, and Wolfram Mathematica.

"Computer-aided design" (CAD) is the use of computing devices to aid in the creation, modification, analysis, or optimization of a design. CAD output is often in the form of electronic files for print, machining, or other manufacturing operations. A non-limiting list of CAD software comprises 123D, ACIS, Advance Concrete, Advance Design, Advance Steel, AllyCAD, ArchiCAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form•Z, FreeCAD, HiCAD, IDEA Architectural, Inventor, IRONCAD, IntelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, RoutCad, SALOME, ShapeManager, SketchUp, Solid Edge, SolidWorks, SolveSpace, SpaceClaim, SpaceClaim Engineer, Tekla Structures, TopSolid, TransMagic, TurboCAD, VariCAD, VectorWorks, and VisualARQ. This non-limiting list comprises CAD software for drawing two-dimensional building plans as well as software for building information modeling. A non-limiting list of BIM software comprises Allplan, ArchiCAD, ARCHLine.XP, Autodesk Revit, BricsCAD, CodeBook, DDS-CAD, Digital Project, FINE MEP, GRAITEC Advance, IDEA Architectural, MicroStation, Navisworks, OpenStudio, RFEM, Tekla BIMsight, Tekla Structures, Trimble SketchUp, VectorWorks Architect, Vico Office, and VisualARQ. One of ordinary skill in the art will appreciate that while the invention pertains specifically to a building information model (BIM), it may also be used for CAD models in different fields, such as, for example, mechanical engineering.

In a first aspect, the present invention provides for a computer-implemented method (CIM) for predicting user desirability of a detail in a building information model (BIM), comprising several steps. In a second aspect, the present invention provides for a computer system for predicting user desirability of a detail in a BIM, whereby the computer system is configured for performing the CIM according to the first aspect. The second aspect may in particular relate to a computer system comprising at least one processor, a visualization means, at least one user input device, and a computer-implemented machine learning module. In a third aspect, the present invention provides for a computer program product (CPP) for predicting user desirability of a detail in a BIM, whereby the CPP comprises instructions which, when the CPP is executed by a computer, cause the computer to carry out the CIM according to the first aspect. The third aspect may in particular relate to a tangible computer-readable non-transitory data carrier comprising said CPP. One of ordinary skill in the art will appreciate that the three aspects of the present invention are interrelated. Therefore, in what follows, no distinction will be made between the three aspects, and all features disclosed above or below can relate to each of the three aspects, even if a feature has been disclosed in conjunction with a particular aspect.

In a step of a particularly preferred embodiment of the present invention, a set of records is obtained. Each record comprises digital data on user input about a detail in relation to a first and a second construction element in a BIM. Preferably, said detail is a constructional connection between the first and the second construction element. Hereby, the user input is one of modelling, accepting and declining of said detail. Hereby, the user input may have been received via at least one user input device. Hereby, a record may comprise a pointer to the corresponding BIM. The first construction elements of the set of records comprise at least one first element property, preferably geometrical property, in common. The second construction elements of the set of records comprise at least one second element property, preferably geometrical property, in common. The first and second construction elements of the set of records comprise at least one relative geometrical property in common. The details of the set of records comprise a set of connection relative geometrical properties with respect to the first and/or the second construction element in common.

In a step of a particularly preferred embodiment of the present invention, a computer-implemented machine learning module is trained based on said set of records for predicting user desirability of a detail. Thereby, for each record of the set of records the following input is provided to the module: at least one further property of the corresponding BIM; and a binary desirability according to the record, which is positive in case of modelling or accepting and negative in case of declining. A "further" property of the BIM is most preferably a property of the BIM not part of any of said at least one first element property, said at least one second element property, said at least one relative geometrical property, and said set of connection relative geometrical properties. One of ordinary skill in the art will appreciate that "positive" and "negative" as used herein refer to two possibilities for binary input, and may in practice be embodied differently, such as, for example, by "1" and "0", and the like. The computer-implemented machine learning module may hereby be trained to categorize user desirability of a detail, whereby two categories are available, e.g. "positive" and "negative", "desired" and "undesired", "1" and "0", and the like.

In a step of a preferred embodiment of the present invention, a set of pairs of construction elements is identified in a BIM. Each pair comprises a first construction element comprising said at least one first element property and a second construction element comprising said at least one second element property. The first and second construction elements of each pair thereby comprise said at least one relative geometrical property.

The set of records may comprise digital data on user input for one BIM; or alternatively may comprise digital data on user input for multiple BIMs, such as a different BIM for each record. The BIM in which the set of pairs is identified may be a different BIM than the BIM/any of the BIMs related to the set of records; or may be a BIM related to at least one record of the set of records.

In a step of a particularly preferred embodiment of the present invention, for each pair of said set of pairs a user desirability is predicted, comprising the step of inputting at least one further property of the corresponding BIM to the trained computer-implemented machine learning module. A predicted user desirability may be a binary desirability. However, preferably, a predicted user desirability may comprise one of many (more than two) possible numerical values. A predicted user desirability may, for example, be a predicted percentage likelihood of ("positive") user desirability.

One or ordinary skill in the art will appreciate that the steps according to the particularly preferred embodiments above may be executed consecutively by a computer as an uninterrupted sequence of steps, whereby no intermediate user input is required. One of ordinary skill in the art will further appreciate that the steps according to the particularly preferred embodiments above define a deterministic procedure for predicting user desirability of a detail. When the same set of records, in the same order, with the same particular properties are used for training the same computer-implemented machine learning module, the latter will provide the same prediction for user desirability upon providing the same corresponding input for the same pair of construction elements.

In a preferred embodiment, the CIM, computer system and CPP according to the present invention are configured for suggesting a detail in a BIM. In this case, for a pair of construction elements of said set of pairs a detail comprising said set of connection relative geometrical properties with respect to the first and/or the second construction element of said pair is suggested. Said suggestion is based on the predicted user desirability of said pair. Said suggestion preferably comprises representing and optionally highlighting the detail on a visualization means.

In a preferred embodiment, multiple pairs of the set of pairs are suggested. They may be suggested simultaneously, for example via simultaneous representation on a visualization means. They may alternatively be suggested sequentially, one at a time, for example via sequential representation on a visualization means. Thereby, user input may be requested per pair of said multiple pairs, for example in order of decreasing predicted user desirability. Preferably, the multiple pairs of the set of pairs are suggested in order of decreasing predicted user desirability until a predetermined amount of suggested details are declined via user input or until a predetermined lower threshold of predicted user desirability is reached. The user input may be provided via at least one user input device.

In a preferred embodiment, user input is received about a suggested constructional connection, whereby the user input is one of accepting or declining. In this embodiment, the computer-implemented machine learning module is additionally trained based on said received user input. Hereby, the following input is provided to the computer-implemented machine learning module: at least one further property of the corresponding building information model; and the binary desirability, which is positive in case of accepting and negative in case of declining. This is advantageous as it allows for continuous learning, in particular boot-strap learning of user desirability.

In a preferred embodiment, the trained computer-implemented machine learning module comprises digital training data. In this embodiment, said step of training the computer-implemented machine learning module comprises the step of updating the digital training data of the computer-implemented machine learning module, based on said at least one further property of the corresponding building information model and said binary desirability. Preferably, the trained computer-implemented machine learning module comprises digital training data and computer-executable instructions for: updating the digital training data based on at least one further property of a BIM and a binary desirability; and outputting a predicted user desirability upon inputting at least one further property of a BIM. Preferably, the computer-implemented machine learning module comprises a classification algorithm based on an artificial neural network, a support vector machine, or a decision tree.

In a most preferred embodiment, the computer-implemented machine learning module comprises computer-executable instructions for:

training an artificial neural network upon receiving as input for each pair of one or more pairs at least one further property of the corresponding BIM and a corresponding binary desirability; and outputting a predicted user desirability upon receiving as input for a pair at least one further property of the corresponding BIM.

A BIM comprises digital data representing a plurality of construction elements. The digital data allow to infer for each construction element a plurality of properties, such as geometrical properties and material properties. Examples of geometrical properties are length, width, shape, inclination with the vertical axis, and the like. Examples of material properties are material specification, tensile strength, and the like. A construction element, as represented by the digital data of the BIM, may comprise (curved or planar) faces, edges and vertices. A wall, for example, may be geometrically represented in a BIM as a cuboid comprising six faces, twelve edges, and eight vertices. The digital data of the BIM further allows to infer for pairs of construction elements relative geometrical properties, such as relative minimal distance, relative angle between planar faces of the construction elements, and the like. In the present document, "construction elements" of a BIM is used as a shorthand for the construction elements represented by the digital data of a BIM. In the present document, "properties" of a BIM is used as a shorthand for the element properties or relative properties represented by the digital data of a BIM.

In the context of the present document and with reference to a particular pair of construction elements of a particular BIM, said pair comprising a first and a second construction element, the properties of the BIM may be subdivided in several, most preferably non-overlapping, categories:

- a preselection category comprising said at least one first element property, said at least one second element property, and said at least one relative geometrical property of the first and second construction elements;
- an insertion category comprising said set of connection relative geometrical properties with respect to the first and/or the second construction element in common; and
- a contextual category comprising said at least one further property of the BIM.

It has to be noted that a further property of the BIM may also be a property of the first constructional element, a property of the second constructional element, a relative geometrical property of the first and second construction elements, or a relative geometrical property of the constructional connection with respect to the first and/or the second construction element, whereby most preferably the categories are non-overlapping.

In a preferred embodiment, all pairs of construction elements, both in the set of records and in the identified set of pairs, have the preselection category of properties in common. The preselection category of properties may be utilized to preselect pairs of construction elements for their compatibility for realizing the detail in relation to the pair of construction elements.

In a preferred embodiment, all details, both user-modelled and computer-suggested, have the insertion category of properties in common. The insertion category of properties may define the essential or all of the properties of the detail realization, such as geometrical properties of the detail and certain connection relative geometrical properties of the detail with respect to the first and/or the second construction element.

In a preferred embodiment, the contextual category of properties comprises further properties of the BIM, most preferably not part of the preselection category or the insertion category, which allow to train the computer-implemented machine learning module in predicting user desirability of the detail depending on the context of the pair of construction elements in the BIM. The contextual category may comprise construction element properties of construction elements in the neighborhood of the pair of construction elements. Hereby, neighborhood may, for example, be defined based on a distance threshold or a distance ranking. The contextual category may comprise properties relating to the semantic context of the BIM, such as whether the pair of construction elements is located outside, inside or on the bounding box of a particular compound of the BIM, such as a particular building or a particular room. Further examples are provided in the corresponding section below.

A construction element can be any element in a BIM. This may be a structural element, an architectural element, a mechanical, electrical and plumbing (MEP) engineering element, and the like. A non-limiting list of construction elements comprises a bath, a beam, a column, a door, an electric plug, an elevator, a faucet, a lamp, a pipe, a ramp, a roof, a shell, a skylight, a slab, a staircase, a toilet, a tube, a wall, a washing sink, a window, and the like. An element may be modeled as monolithic, or may comprise multiple components, layers, or the like.

A non-limiting list of construction element properties comprises geometry, position, orientation, material, function, presence of a component, and the like. For a construction element comprising multiple layers, a non-limiting list of properties further includes number of layers, layer thickness, layer material, presence of neighboring layers comprising certain materials, presence of neighboring layers comprising certain thicknesses, and the like.

A non-limiting list of "geometrical properties" comprises a closed interval, a half-open interval or a value for an orientation; a position; a dimension, such as a length, a width, a height, a thickness, a diameter, and the like; an inclination, such as with the vertical axis; an area; or a volume. A non-limiting list of "relative geometrical properties" is a closed interval, a half-open interval or a value for a relative distance; a relative orientation; a relative location; a relative height; or a relative angle.

"Detail" as used herein refers to a structural feature of a BIM, such as a construction element, a construction boundary, a geometric constraint, and the like. A non-limiting list of details comprises a connection type, a spacing, an additional insertion element, and the like. A "detail" may thereby be realized in a BIM via user input, e.g. a sequence of direct modelling commands. It differs from said user input in that it is the structural feature in the BIM resulting from said user input. A "detail" may be subject to rules, e.g. a verification of a building standard. It differs from said rules in that it is a structural feature, such as a construction element (e.g. stairs), a construction boundary (e.g. connection type) or a geometric constraint (e.g. width of stairs), and thereby comprises one or more geometrical properties and optionally one or more material properties, whereby said geometrical and material properties may be subject to said rules. The geometrical properties of a "detail" may be visualized via a visualization means, like any element in a BIM. A detail differs from the visualization itself in that the BIM comprises digital data comprising the detail, and that said digital data may also, in principle, be outputted in other ways, such as audio or tactile output, and may be transferred or copied from a first tangible non-transitory computer-readable storage medium to a second tangible non-transitory computer-readable storage medium without intermediate visualization.

In a preferred embodiment, a detail is a constructional connection, whereby the constructional connection is one of a construction element and a construction boundary. A construction element comprises a relative position with respect to each of said two construction elements. A construction boundary is a tangent boundary between a pair of construction elements, e.g. a boundary where two walls join.

In a preferred embodiment, the constructional connection is a tangent boundary between the first and second construction element. In this case, said set of connection relative geometrical properties may comprise a relative angle with respect to a face of the first and/or the second construction element.

Preferably, said at least one first element geometrical property comprises multiple, such as at least two, preferably at least three, first element geometrical properties. Preferably, said at least one first element geometrical property is at least one first element geometrical property and at least one first element material property. Preferably, said first construction element comprises multiple layers and said at least one first element geometrical property is a first set of properties comprising a number of layers and for each layer a layer thickness and a layer material property.

Preferably, said at least one second element geometrical property comprises multiple, such as at least two, preferably at least three, second element geometrical properties. Preferably, said at least one second element geometrical property is at least one second element geometrical property and at least one second element material property. Preferably, said second construction element comprises multiple layers and said at least one second element geometrical property is a second set of properties comprising a number of layers and for each layer a layer thickness and a layer material property.

In a preferred embodiment, said at least one relative geometrical property comprises a closed interval, a half-open interval or a value for a relative angle. Preferably, said at least one relative geometrical property further comprises a half-open interval of a relative distance. One of ordinary skill in the art will appreciate that, in case the detail is a connection boundary, said relative distance is a relative distance prior to modification of one or both of the construction elements for realization of the detail.

In a preferred embodiment, the BIM comprises an embedding compound. The embedding compound comprises a pair of construction elements, comprising the first construction element and the second construction element. The embedding compound further comprises a third construction element. In this embodiment, said at least one further property of the BIM is a set of properties comprising at least two of a relative geometrical property of the third and first construction elements; a relative geometrical property of the third and second construction elements; a relative geometrical property of the first construction element and the embedding compound; a relative geometrical property of the second construction element and the embedding compound; a geometrical property of the third construction element; and a geometrical property of the embedding compound.

In a preferred embodiment, said at least one further property of the BIM comprises a relative distance, a relative location or a relative height of the constructional connection with respect to a face, an edge or a vertex of the second constructional element.

In a preferred embodiment, at least one required modification of the first and/or the second construction element is inferred from the BIM for realizing the detail in relation to the first and the second construction element of the pair, preferably the constructional connection between the first and the second construction element of the pair. Preferably, said at least one modification comprises at least one geometrical property. Preferably, said at least one further property of the BIM is a set of properties comprising said at least one geometrical property of said at least one modification.

The invention is further described by the following non-limiting examples which further illustrate the invention, and are not intended to, nor should they be interpreted to, limit the scope of the invention.

EXAMPLES

Example 1

Connection Between a Wall and a Slab

A first example pertains to a connection between a wall and a slab. Each of the wall and the slab comprises an orientation and multiple layers, each layer a cuboid of a certain material and thickness. The orientation of the wall is vertical and of the slab horizontal. Each cuboid layer comprises two large parallel side surfaces and four end surfaces. The constructional connection (detail) may be specified in relation to the wall and the slab (the construction elements), and may comprise the extension or shortening of end surfaces of certain layers of one element to certain side surfaces of certain layers of the other element. The invention provides in the suggestion of the constructional connection between similar pairs of elements, and a module to provide informed suggestions based on machine learning based on previous responses to suggestions. The similarity is thereby based on at least one property of: orientation, number of layers, layer materials, layer thicknesses, adjacency of certain layers, and the like.

Example 2

Finishing of a Wall

A second example pertains to a finishing of a wall. The relevant elements in this example are a wall and a slab. The slab comprises the semantic interpretation of a building foundation and comprises a horizontal orientation. The wall has a vertical orientation and comprises a side surface not facing another wall, whereby on said side surface a finishing (the detail, i.e. an additional insertion element, e.g. a plaster layer) is included. By training the module with multiple walls, the module may learn that walls directly supporting on the building foundation and comprising a side surface not facing another wall (facade) require a plaster finishing.

Example 3

Exemplary Embodiment

A first and a second construction element are provided in a BIM. The first construction element comprises a first set of properties. The second construction element comprises a second set of properties. A detail defined in relation to the first and the second construction element is identified. Preferably, the identification is performed upon inclusion of the detail. More preferably, the identification is performed upon inserting the detail by direct modeling operations. The identification may however also occur by selection of the detail, for example, after loading said BIM comprising said first and said second construction element and said detail in relation to said first and said second construction element from a tangible non-transitory computer-readable storage medium. Preferably, said identification occurs upon reception of user input. In case the detail is a construction element, the detail may be identified upon adding said construction element to the BIM and/or positioning said construction element relative to each of said two construction elements. In case the detail is a construction boundary, the detail may be identified upon performing one or more direct modelling operations on one or both of said two construction elements, thereby forming or adjusting a boundary between said two construction elements. A computer-implemented machine learning module is trained with at least one further property of the BIM and a categorization of positive user desirability.

A set of pairs is obtained. A pair comprises a first and a second pair element. The first pair element comprises at least one property in common with the first construction element. The second pair element comprises at least one property in common with the second construction element. Preferably, the first pair element comprises multiple properties in common with the first construction element, such as at least two properties, at least three properties, or at least four properties. Preferably, the second pair element comprises multiple properties in common with the second construction element, such as at least two properties, at least three properties, or at least four properties. For a pair of the set of pairs, user desirability is predicted via the trained computer-implemented machine learning module, and depending on the predicted user desirability inclusion of the detail in relation to the first and the second pair element of the pair may be suggested. A response to the suggestion to include the detail is received. The module is further trained with the received response and at least one further property of the corresponding BIM, allowing for boot-strap continuous learning of user desirability.

Example 4

Further Features of the Exemplary Embodiment in Example 3

A set of pairs is initially obtained, and subsequently a subset of the set of pairs is selected based at least in part on likelihood of acceptance of the pairs in the subset. The likelihood of acceptance is hereby based at least in part on the output from the module. The module may be further trained after each acceptance or decline of a detail suggestion. The module may also be trained only after a part of the subset or the whole subset is suggested to the user. The subset may be updated after each acceptance or decline of detail suggestion. The subset may also be updated only after a part of the subset or the whole subset is suggested to the user.

Identification of a detail may involve insertion or inclusion of the detail. Insertion of the detail may be performed by direct modeling operations. Identification of the detail may involve selection of the detail. A user may have the option to switch automatic detail suggestion on or off. Automatic detail suggestion is a so-called push mechanism in this case, decided by the computer program product. A user may also have the option upon selection of a detail, to request further detail suggestion by providing a detail suggestion request via at least one of the at least one user input device. Detail suggestion is a so-called pull mechanism in this case, requested by the user.

In a preferred embodiment, a BIM comprises an embedding compound comprising the pair. The training data is in this preferred embodiment based at least in part on at least one of: a geometry of the embedding compound (e.g. a floor area of the embedding compound), an orientation of the embedding compound, a functional characteristic of the embedding compound, a presence of a particular component in the embedding compound, and a number of in essence similar details within the compound.

In a preferred embodiment, the training data is based at least in part on properties of a third element in the neighborhood of the first and the second pair element. Neighborhood may thereby be defined based on rank-based proximity or a distance cut-off. A non-limiting list of examples of said third elements comprises a bath, a piece of furniture, a door, a window, a column, a tube, a pipe, a vent, and the like.

In a preferred embodiment, the invention provides in storing analysis data on a tangible non-transitory computer-readable storage medium. The analysis data hereby comprises information about the detail, information about the first and the second construction element, and statistical response data related to received responses. Preferably, the analysis data further comprises information about each suggested pair. This is advantageous as it enables the long-term learning of user decisions and the therefrom resulting decisions for suggesting details over multiple executions of a BIM software program.

In a preferred embodiment, the analysis data is stored for a multitude of building information models (i.e. a multitude of projects) in order to train the module with global properties of building information models (i.e. projects). This allows for the module to learn an architectural style by a user or a group of users (such as the employees of an architectural firm) in function of the project, for example building purpose. Details may for example differ for shopping centers, apartment buildings, and houses. When designing buildings with similar properties and/or functions, details in relation to such buildings may then be suggested.

In a preferred embodiment, the invention provides for detecting the inclusion of a detail contradictory to statistical expectations of the trained module; and querying the user whether the detail contradictory to statistical expectations of the module was an error. The module hence does not only enable informed suggestion of detail inclusion, but also the detection of erroneously placed details.

In a preferred embodiment, the invention provides for scanning of a possible detail inclusion upon insertion of a new element in a BIM. In particular, when an element is introduced in a BIM, a pairing element to the introduced element is searched in the BIM, for which the detail can be included in relation to the introduced element and the pairing element. From the module a statistical expectation is obtained whether the detail is likely to be included. If statistically expected (e.g. threshold-based likelihood), inclusion of the detail in relation to the introduced element and the pairing element is suggested. This is advantageous, as connections, for example, are most often made immediately after inserting the element which needs to be connected.

In a preferred embodiment, a suggested and subsequently included detail is further editable. The editing may be performed via at least one of the at least one user input device of the system. The module may further be trained based on the edited detail and the properties of the first pair element and the second pair element for which the detail was included, in order to learn more specific detail suggestion based on further properties of the first and the second pair element.

In a preferred embodiment, the trainable module based on artificial intelligence comprises a classification algorithm based on machine learning and/or statistical learning. The module is trained for pattern recognition in relation to user detail insertion. Preferably, the trainable module comprises a classification algorithm based on an artificial neural network, a support vector machine, or a decision tree. The applicant has found that the specific choice of either an artificial neural network, a support vector machine, or a decision tree has only minor effect on the accuracy. The choice of input for the trainable module was found to be substantially more influential on the outcome.

The above-disclosed features are not limitative to at most two construction elements and at most two corresponding pair elements. The identification of a detail defined in relation to a first and a second construction element does not exclude that said detail was additionally defined in relation to a third construction element. The subsequent obtaining of a set of pairs does not exclude that a pair is in fact part of a group, whereby the group comprises a first, a second, and a third group element, with properties in common with the construction elements. Similarly, four, five, six, seven or more construction elements and four, five, six, seven or more group elements may be utilized in certain embodiments of the present invention.

Example 5

Switching from Pull-Based to Push-Based Detail Suggestion

A user places a previously unutilized piece of furniture in a room of a BIM. At first, the BIM software program perceives the piece of furniture as a unique piece, and does not consider the piece electable for further inclusion suggestion. Upon placement of a second instance of said piece of furniture, or upon request by the user for inclusion suggestion (pull mechanism), the BIM software program considers the piece electable for further inclusion suggestion, and starts performing the method according to the first aspect of the present invention at its own motion (push mechanism). The module will be trained for inclusion suggestion of instances of said piece of furniture based on user acceptance or decline and further based on properties such as the type of room (a clothing closet placed in a bedroom, but not in a toilet), the location within the room (preferably a clothing closet is placed against a wall), the distance to windows, doors, and other types of furniture (not overlapping with the doors and windows; accessibility of a bed; opening of said clothing closet), and the like.

Example 6

Connection in Relation to a Multi-Layered Wall and a Multi-Layered Slab

This example is an elaboration of example 1 based on FIGS. 1A to 1G.

Figure 1B:
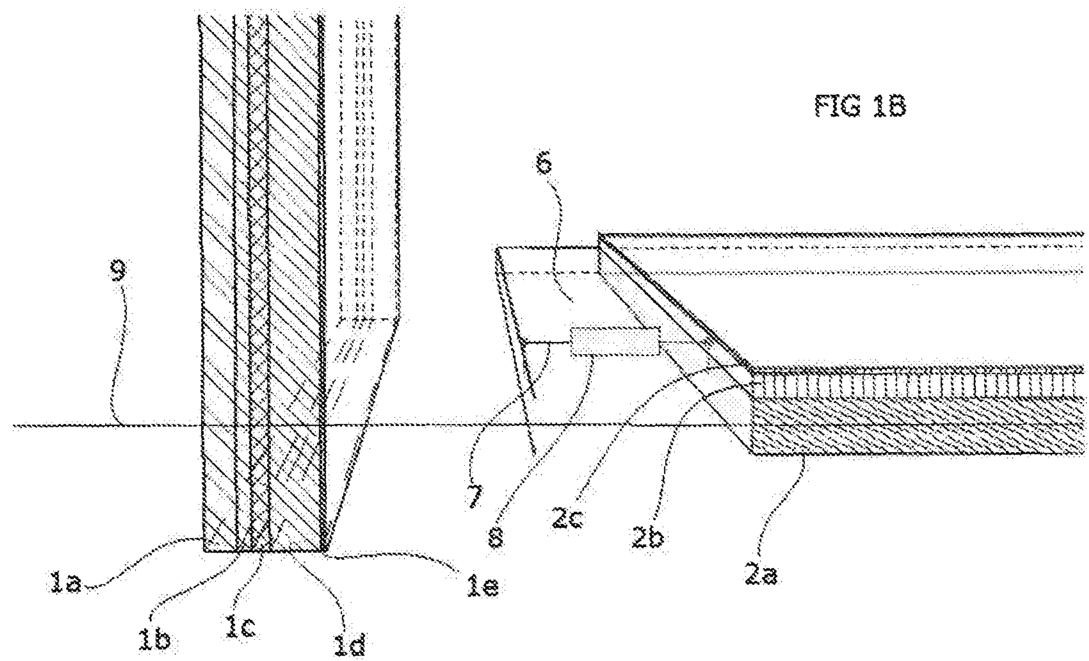

FIG. 1A shows a first wall (1), a second wall (5), a top slab (4), a middle slab (3), and a ground slab (2). Each of the walls and each of the slabs is a multi-layered structure comprising several layers of a certain thickness, in a certain ordering, and comprising certain materials. FIG. 1B shows the layers (1*a*, 1*b*, 1*c*, 1*d*, 1*e*) of the first wall (1) and the layers (2*a*, 2*b*, 2*c*) of the ground slab (2). The ground level (9) cuts through a first slab layer (2a) of the ground slab (2). A user extends (6) this first slab layer (2*a*) towards the first wall (1). A relative position indicator comprising a line (7) and a textbox (8) indicates the extension distance of the first slab layer (2*a*) beyond the original position.

Figure 1C:
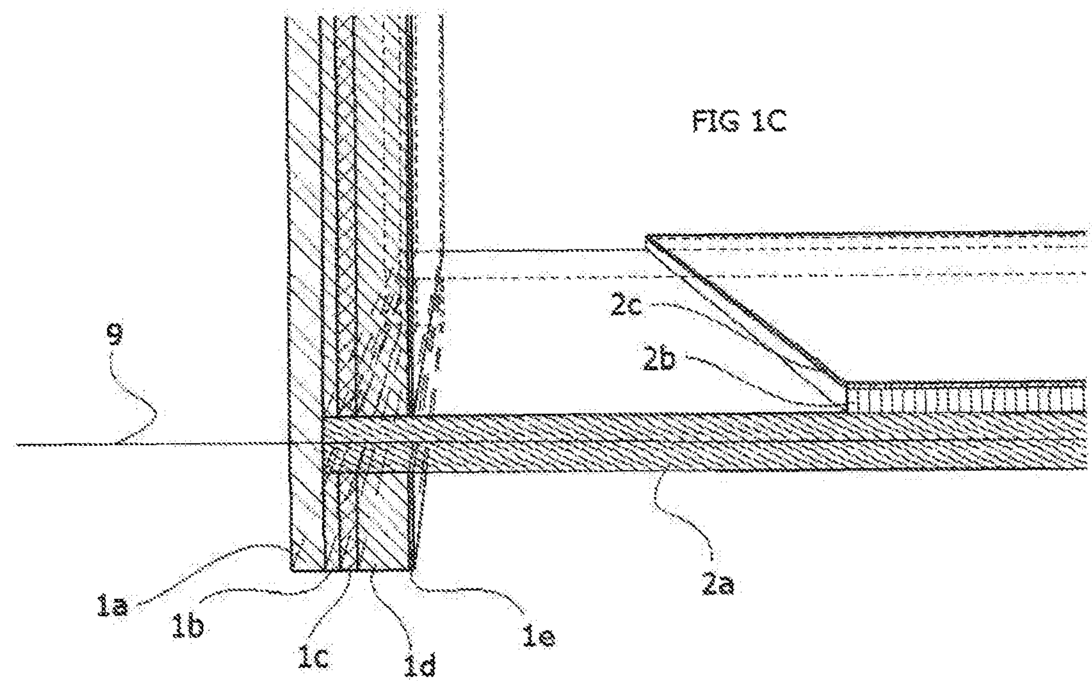

The user drags the side face of the first slab layer (2*a*) to the interface in between the first wall layer (1*a*) and the second wall layer (1*b*) of the first wall (1), onto which it is snapped when said side face is within a predefined distance of said interface. The result is shown in FIG. 1C. The dragging may be performed by selecting said side face with a computer mouse by moving a cursor in the neighborhood of said side face and pressing a computer mouse button; moving the computer mouse in the drag direction while keeping the computer mouse button pressed; and releasing the computer mouse button once said side face is snapped onto said interface.

Figure 1D:
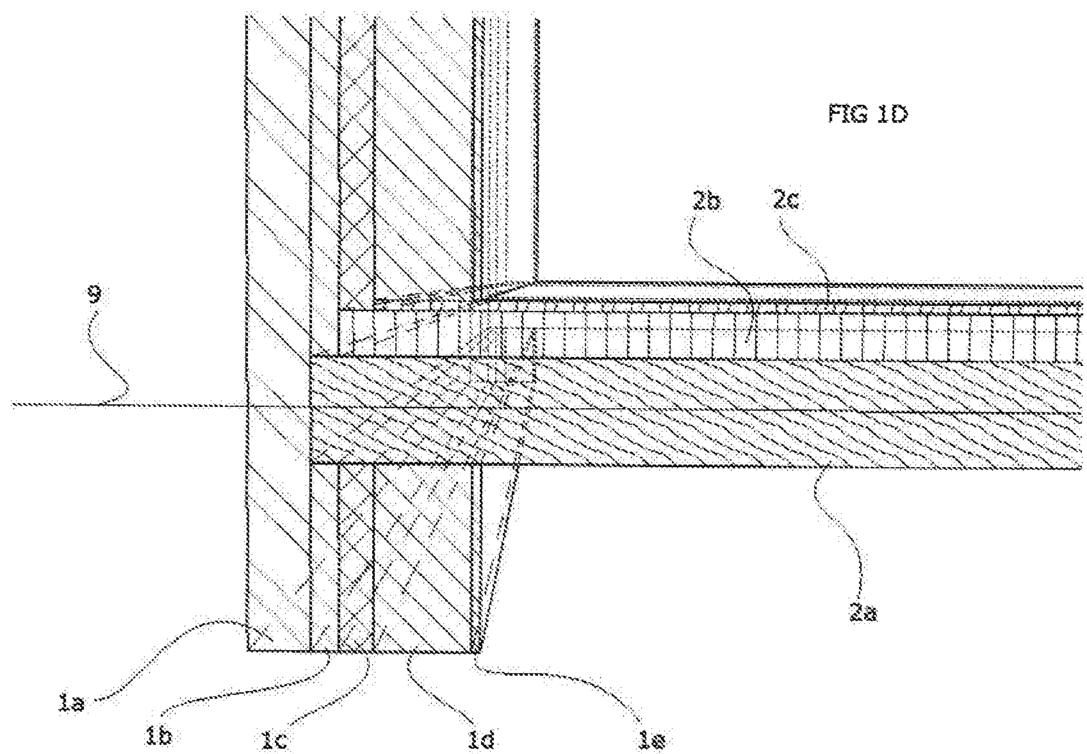

The user can likewise extend the side face of the second slab layer (2*b*) to the interface of the second wall layer (1*b*) and the third wall layer (1*c*) of the first wall, and the side face of the third slab layer (2*c*) to the interface of the third wall layer (1*c*) and the fourth wall layer (1*d*). The result is shown in FIG. 1D.

In this example the first and the second construction elements are the multi-layered ground slab (2) and the multi-layered first wall (1). The detail is the specific connection of the ground slab (2) and the first wall (1), as described above and as shown in FIG. 1D.

Figure 1E:
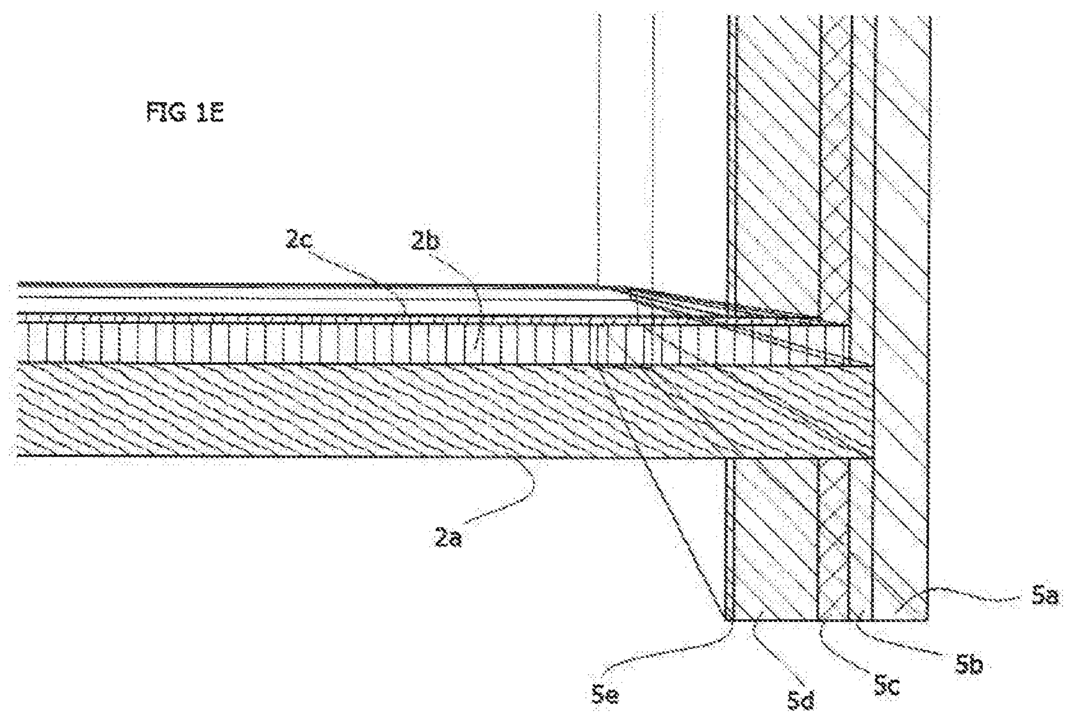

In FIG. 1E, the second wall (5) and the ground slab (2) are shown. The second wall (5) also comprises five layers (5*a*, 5*b*, 5*c*, 5*d*, 5*e*) of the same thicknesses and materials, and in mirrored ordering as compared to the first wall (1). A similar connection between the ground slab (2) and the second wall (5) is therefore suggested. Thereto the visualization means can indicate the suggested connection on the screen. Optionally, the suggestion can additionally or alternatively be presented via the visualization means in a command line section, allowing the user to input acceptance or decline with a keyboard. Optionally, the suggestion can additionally or alternatively be presented in a pop-up window via the visualization means, allowing the user to input acceptance or decline with a keyboard or computer mouse. Once accepted, the state of the BIM is adapted accordingly and training data at least in part related to the ground slab (2), the second wall (5), the connection between the ground slab (2) and the second wall (5), and the acceptance is used to train the module.

Figure 1F:
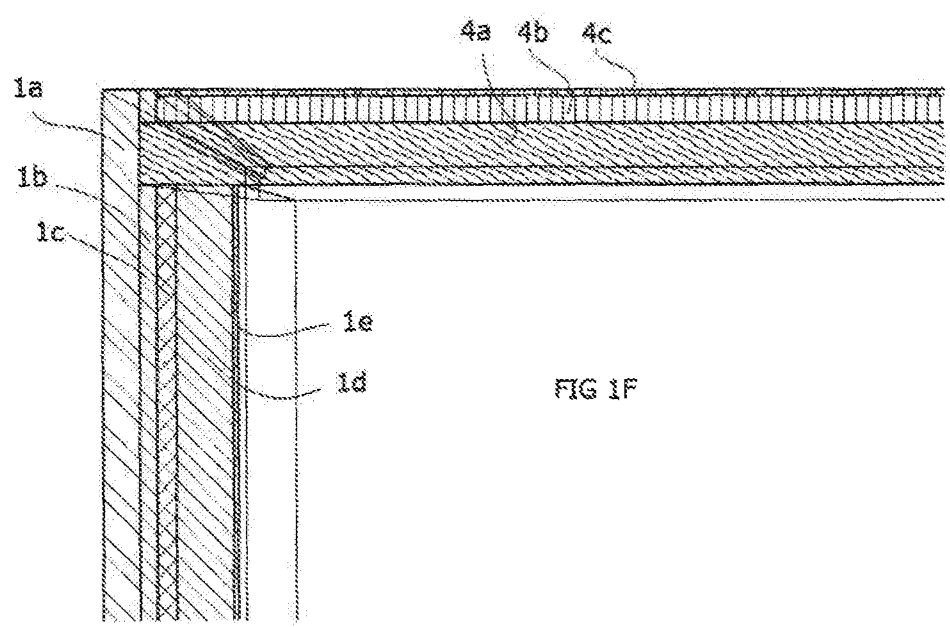
Figure 1G:
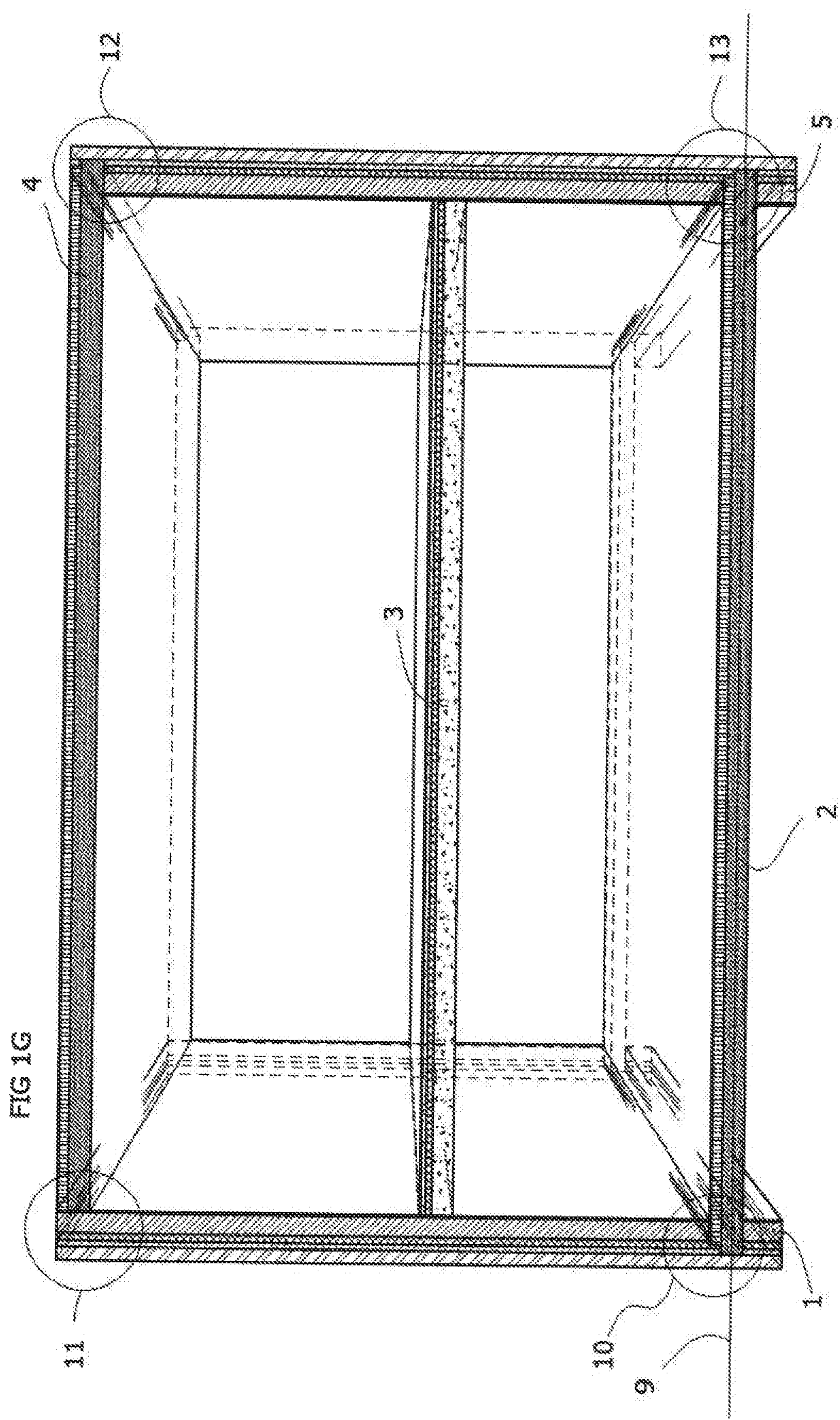

Further detail suggestion can, for example, be made for the top slab (4) and the first wall (1), since the top slab (4) comprises a similar multi-layer structure (4*a*,4*b*, 4*c*) as the ground slab (2). This suggestion is shown in FIG. 1F. Suppose the user accepts the connection between the top slab (4) and the second wall (5), but refuses the connection between the top slab (4) and the first wall (1). The result is shown in FIG. 1G. All acceptances and declines are used to train the module. In particular, the connection (10) was made by the user. Connections (12) and (13) were suggested and accepted. Connection (11) was suggested and declined.

As further shown in FIG. 1G, the middle slab (3) comprises a different number of layers and each of different materials and thicknesses as compared to the top and ground slab layers (4*a*, 4*b*, 4*c*, 2*a*, 2*b*, 2*c*) and therefore no detail suggestion is made to connect the middle slab (3) to the first and/or the second wall (1, 5).

In case the middle slab (3) would have certain layers in common with the top and the ground slabs (4, 2), for example three layers in common with an additional fourth layer on top, connection of the three common slab layers of the middle slab (3) also comprised in the top and the ground slabs (4, 2) to the first and the second wall (1, 5) may be suggested.

In case the middle slab would have a layer of a material and/or a thickness which is also present in a slab layer of the ground slab, a similar extension of said layer of said middle slab may be suggested based on the material and/or the thickness in common.

In case the middle slab would have three layers, a similar extension of said middle slab may be suggested based on the number of layers in common.

Example 7

Non-Limiting List of Exemplary Properties

A non-limiting list of exemplary properties comprises:

the type of the construction elements (pair; first and second);

whether they are layered or not;

how many layers and which type of layers (structural/insulation/finishing) of the first construction element have been directly connected to layers of the second construction element;

the height (for a wall or column) on which a constructional connection occurs;

the location of a connection (e.g. near an edge or near the middle);

to which and how many other construction elements the construction elements are connected;

whether a construction element is internal or external;

whether a slab is base, middle or roof;

whether columns or beams are inside the building or on the exterior;

length of the constructional connection;

overall dimensions of the construction elements;

slopes of the building elements; and the like.

The invention claimed is:

1. Computer-implemented method for predicting user desirability of a constructional connection in a building information model, the method comprising the steps of:

obtaining a set of records, each record comprising digital data on user input about a constructional connection between a first and a second construction element in a building information model, said user input one of modeling, accepting and declining of said constructional connection, whereby further:

the first construction elements of the set of records comprise at least one first element geometrical property in common;

the second construction elements of the set of records comprise at least one second element geometrical property in common;

the first and second construction elements of the set of records comprise at least one relative geometrical property in common; and the constructional connections of the set of records comprise a set of connection relative geometrical properties with respect to the first and/or the second construction element in common;

training a computer-implemented machine learning module based on said set of records for predicting user desirability of a constructional connection, thereby providing for each record the following input to the computer-implemented machine learning module:

at least one further property of the corresponding building information model; and a binary desirability according to the record, which is positive in case of modeling or accepting and negative in case of declining, identifying in a building information model a set of pairs of construction elements, each pair comprising a first construction element comprising said at least one first element geometrical property and a second construction element comprising said at least one second element geometrical property, whereby the first and second construction elements of the pair comprise said at least one relative geometrical property, and predicting for each pair of said set of pairs a user desirability comprising the step of inputting at least one further property of the corresponding building information model to the trained computer-implemented machine learning module.

2. Computer-implemented method according to claim 1, comprising the step of suggesting for a pair of construction elements a constructional connection comprising said set of connection relative geometrical properties with respect to the first and/or the second construction element of said pair.

3. Computer-implemented method according to claim 2, comprising the steps of:

receiving user input about the suggested constructional connection, the user input one of accepting or declining;

training the computer-implemented machine learning module based on said received user input, thereby providing the following input to the module:

at least one further property of the corresponding building information model; and the binary desirability, which is positive in case of accepting and negative in case of declining.

4. Computer-implemented method according to claim 3, wherein the trained computer-implemented machine learning module comprises digital training data, and whereby said step in claim 3 of training the computer-implemented machine learning module comprises the step of updating the digital training data of the computer-implemented machine learning module.

5. Computer-implemented method according to claim 3, wherein each of said at least one modification comprises at least one geometrical property, and wherein said at least one further property of the building information model is a set of properties comprising said at least one geometrical property of said at least one modification.

6. Computer-implemented method according to claim 1, wherein a geometrical property is one of a closed interval, a half-open interval and a value of one of: an orientation; a position; a dimension; an inclination; an area; and a volume, and wherein a relative geometrical property is one of a closed interval, a half-open interval and a value of one of: a relative distance; a relative orientation; a relative location; a relative height; and a relative angle.

7. Computer-implemented method according to claim 1, wherein said at least one first element geometrical property includes at least one first element material property.

8. Computer-implemented method according to claim 1, wherein said first construction element comprises multiple layers and said at least one first element geometrical property is a first set of properties comprising a number of layers and for each layer a layer thickness and a layer material property.

9. Computer-implemented method according to claim 1, wherein said at least one relative geometrical property comprises a closed interval, a half-open interval, a value of a relative angle, or a half-open interval of a relative distance.

10. Computer-implemented method according to claim 1, wherein a building information model comprises an embedding compound comprising a third construction element and a pair of construction elements comprising the first construction element and the second construction element, wherein said at least one further property of the building information model is a set of properties comprising at least two of:

a relative geometrical property of the third and first construction elements;

a relative geometrical property of the third and second construction elements;

a relative geometrical property of the first construction element and the embedding compound;

a relative geometrical property of the second construction element and the embedding compound;

a geometrical property of the third construction element; and a geometrical property of the embedding compound.

11. Computer-implemented method according to claim 1, wherein said at least one further property of the building information model comprises a relative distance, a relative location or a relative height of the constructional connection with respect to a face, an edge or a vertex of the second constructional element.

12. Computer-implemented method according to claim 1, comprising the step of inferring from the building information model at least one required modification of the first and/or the second construction element for realizing the constructional connection between the first and the second construction element of the pair.

13. Computer-implemented method according to claim 1, wherein the constructional connection is a tangent boundary between the first and second construction elements, wherein said set of connection relative geometrical properties comprises a relative angle with respect to a face of the first and/or the second construction element.

14. Computer-implemented method according to preceding claim 1, wherein the machine learning module comprises a classification algorithm based on an artificial neural network, a support vector machine, or a decision tree.

15. Computer-implemented method according o preceding claim 1, comprising the further steps of:

suggesting for multiple pairs of the set of pairs a constructional connection; and requesting per pair of said multiple pairs user input.

16. Computer-implemented method according to preceding claim 15, wherein the step of requesting per pair of said multiple pairs user input is performed in order of decreasing predicted user desirability.

17. Computer system for predicting user desirability of a constructional connection in a building information model, the computer system configured for performing a computer-implemented method according to:

obtaining a set of records, each record comprising digital data on user input about a constructional connection between a first and a second construction element in a building information model, said user input one of modeling, accepting and declining of said constructional connection, whereby further:

the first construction elements of the set of records comprise at least one first element geometrical property in common;

the second construction elements of the set of records comprise at least one second element geometrical property in common;

the first and second construction elements of the set of records comprise at least one relative geometrical property in common; and the constructional connections of the set of records comprise a set of connection relative geometrical properties with respect to the first and/or the second construction element in common;

training a computer-implemented machine learning module based on said set of records for predicting user desirability of a constructional connection, thereby providing for each record the following input to the computer-implemented machine learning module:

at least one further property of the corresponding building information model; and a binary desirability according to the record, which is positive in case of modeling or accepting and negative in case of declining, identifying in a building information model a set of pairs of construction elements, each pair comprising a first construction element comprising said at least one first element geometrical property and a second construction element comprising said at least one second element geometrical property, whereby the first and second construction elements of the pair comprise said at least one relative geometrical property, and predicting for each pair of said set of pairs a user desirability comprising the step of inputting at least one further property of the corresponding building information model to the trained computer-implemented machine learning module.

18. Computer program product for predicting user desirability of a constructional connection in a building information model, the computer program product comprising instructions stored on a non-transitory computer-readable storage medium which, when the computer program product is executed by a computer, cause the computer to carry out a computer-implemented method according to:

obtaining a set of records, each record comprising digital data on user input about a constructional connection between a first and a second construction element in a building information model, said user input one of modeling, accepting and declining of said constructional connection, whereby further:

the first construction elements of the set of records comprise at least one first element geometrical property in common;

the second construction elements of the set of records comprise at least one second element geometrical property in common;

the first and second construction elements of the set of records comprise at least one relative geometrical property in common; and the constructional connections of the set of records comprise a set of connection relative geometrical properties with respect to the first and/or the second construction element in common;

training a computer-implemented machine learning module based on said set of records for predicting user desirability of a constructional connection, thereby providing for each record the following input to the computer-implemented machine learning module:

at least one further property of the corresponding building information model; and a binary desirability according to the record, which is positive in case of modeling or accepting and negative in case of declining, identifying in a building information model a set of pairs of construction elements, each pair comprising a first construction element comprising said at least one first element geometrical property and a second construction element comprising said at least one second element geometrical property, whereby the first and second construction elements of the pair comprise said at least one relative geometrical property, and predicting for each pair of said set of pairs a user desirability comprising the step of inputting at least one further property of the corresponding building information model to the trained computer-implemented machine learning module.

* * * * *